United States Patent [19]

Ferrer et al.

[11] Patent Number: 4,686,528
[45] Date of Patent: Aug. 11, 1987

[54] METHOD OF ENCODING AND DECODING DATA SIGNALS

[75] Inventors: Enrique Ferrer, Miami; Charles M. Schlosser, Coral Springs, both of Fla.

[73] Assignee: Motorola, Inc., Schaumburg, Ill.

[21] Appl. No.: 843,876

[22] Filed: Mar. 26, 1986

Related U.S. Application Data

[63] Continuation of Ser. No. 575,646, Jan. 31, 1984, abandoned.

[51] Int. Cl.⁴ .............................................. G08B 5/22
[52] U.S. Cl. ............................................... 340/825.44
[58] Field of Search .............................. 364/200, 900; 340/825.44, 825.48

[56] References Cited

U.S. PATENT DOCUMENTS

| | | | |
|---|---|---|---|
| 3,944,724 | 3/1976 | Kilby et al. | 178/4.1 A |
| 3,988,676 | 10/1976 | Whang | 325/38 A |
| 4,083,010 | 4/1978 | Looschen | 325/321 |
| 4,131,761 | 12/1978 | Giusto | 179/15 BY |
| 4,201,942 | 5/1980 | Powner | 375/17 |
| 4,244,051 | 1/1981 | Fujikura | 375/17 |
| 4,264,973 | 4/1981 | Hustig | 375/17 |
| 4,346,452 | 8/1982 | Groves | 364/900 |
| 4,354,252 | 10/1982 | Lamb et al. | 364/900 |
| 4,361,876 | 8/1982 | Groves | 364/900 |

Primary Examiner—Gareth D. Shaw
Assistant Examiner—John G. Mills
Attorney, Agent, or Firm—Daniel K. Nichols; Joseph T. Downey; Anthony J. Sarli

[57] ABSTRACT

In a multiple state data signal, a first and second state are equated to logic states while a third state is designated as a read state. The read state and one of the two logic states are alternately generated so that each logic state is immediately preceeded by a read signal which may be utilized to tell the peripheral that a valid bit of data follows.

1 Claim, 2 Drawing Figures

METHOD OF ENCODING AND DECODING DATA SIGNALS

BACKGROUND OF THE INVENTION:

Field of the Invention

This invention relates generally to a variable baud rate data communication system and more particularly to a data interface between a display or date pager and a printer through a single unidirectional port.

Whenever it is necessary for communication to take place between two pieces of digital equipment, it is normally necessary to provide some sort of synchronization between the two pieces of equipment so that the receiving equipment knows when to look for valid data. In some such systems, a clock signal is recovered from the transmitted data and used to clock the receipt of data by the receiving equipment. In other such systems a separate clock signal may be transmitted from the transmitting equipment to the receiving equipment for similar purposes. Still other systems may utilize multiple sampling of each bit by the receiving equipment in order to asynchronously detect the data being transmitted.

Each of these systems has its drawbacks. For example, when the clock signal must be derived from the encoded data, complex decoding circuitry is necessary in the receiving equipment in order to accomplish this. In addition, wide bandwidth circuitry may also be necessary depending on the data rate. When a separate clock line is used, separate hardware interconnections for the clock line are necessary. This may be prohibitive when dealing with miniaturized equipment such as paging receivers. In asynchronous multiple sample per bit systems, complex circuitry is also necessary to assure freedom from or minimization of errors.

In each of these techniques it is also desirable if not necessary for the receiving equipment to know the approximate frequency of transmission of data from the transmitting equipment. The present invention circumvents these problems by providing a system of communications between a pager and a printer or other peripheral which may operate at a truly variable baud rate (up to the maximum hardware limitations of the receiving and transmitting circuitry). Only one interconnection line is necessary and encoding and decoding circuitry remain simple.

SUMMARY OF THE INVENTION

It is an object of the present invention to provide an improved variable baud rate system for a pager/printer interface.

It is another object of the present invention to provide a method of interpreting a multiple state data signal for use in a variable baud rate data system.

It is another object of the present invention to provide a method of generating a multiple state data signal suitable for use in a variable baud rate data system.

It is a further object of the present invention to provide an improved interface between a data pager and its peripherals utilizing a minimum number of interface ports while maintaining simplicity of encoding and decoding circuitry.

These and other objects of the invention will become apparent to those skilled in the art upon consideration of the following description of the invention.

In one embodiment of the present invention, a method of interpreting a coded data signal, wherein the coded data signal includes a plurality of sequential data bits each one of which is associated with and immediately preceeded by a read signal, includes the steps of detecting the read signal and reading the single data bit which immediately follows and is associated with the read signal.

In another embodiment of the present invention, a method of generating a multiple state data signal includes the steps of equating a first of the states with a first logic state and the second of the states with a second logic state, designating a third of the states as a read state and alternately generating the read state and one of the logic states to comprise a multiple state data signal wherein each valid logic state is immediately preceeded by a read state.

The features of the invention believed to be novel are set forth with particularity in the appended claims. The invention itself however, both as to organization and method of operation, together with further objects and advantages thereof, made be best understood by reference to the following description taken in conjunction with the accompanying drawings.

DETAILED DESCRIPTION OF THE PREFERRED EMBODIMENT

Figure 1:
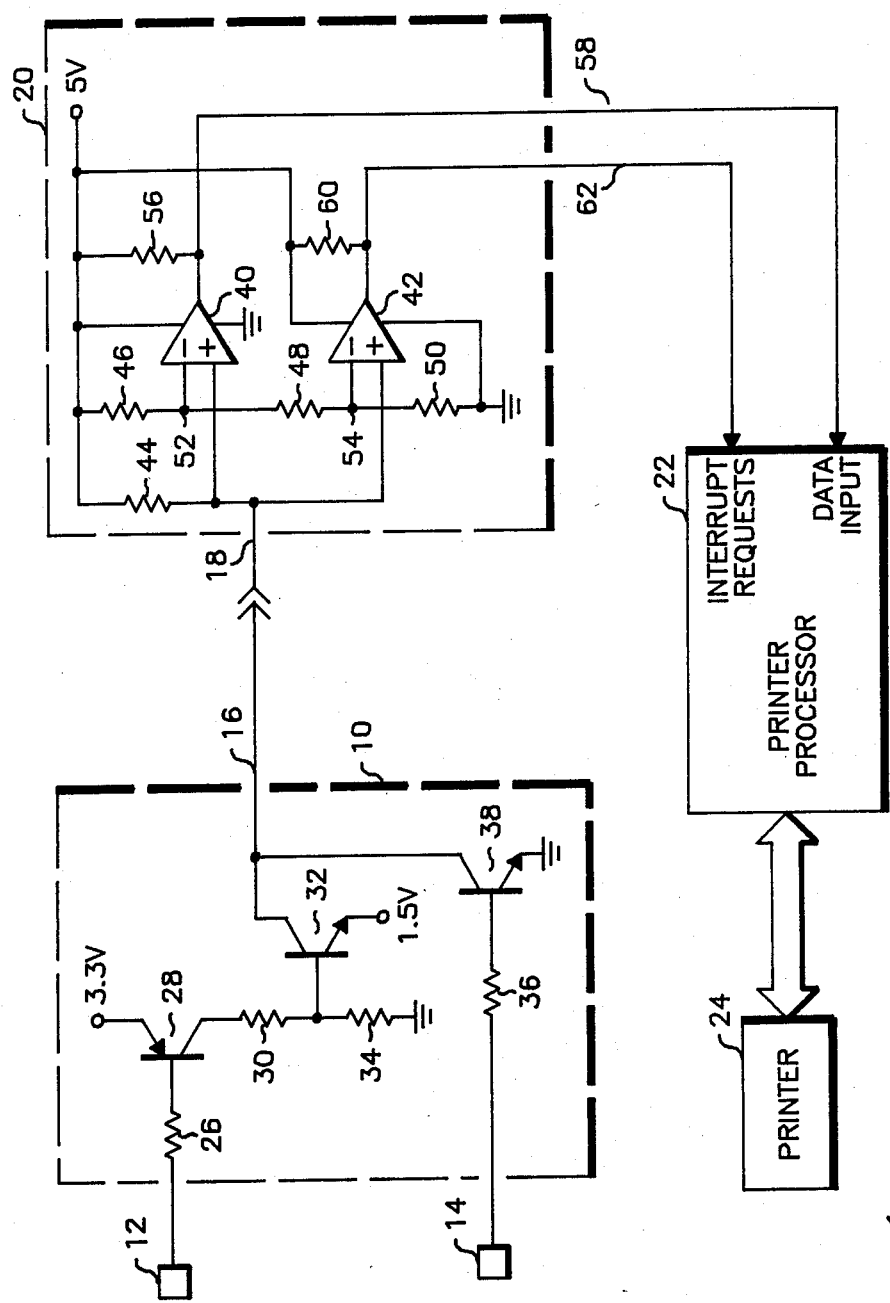
FIG. 1 shows a schematic representation of a preferred implemetation of the present invention.

Turning now to FIG. 1, a circuit arrangement for practicing the present invention is shown. According to the preferred embodiment, the present invention is utilized in facilitating transmission of data from a data pager to a peripheral unit such as a printer. Accordingly, a signal combiner 10 forms a portion of the data pager. A suitable data pager used with the present invention is the OPTRX ™ Series display radio pager manufactured by Motorola, Inc., the assignee of the present invention. This pager is described and illustrated in the "OPTRX" Series display radio pagers instruction manual, Motorola No. 68T81025C50-0 the content of which is hereby incorporated by reference.

Signal combiner 10 includes a data input 12 which may receive data from the data limiter on the low conversion/demodulator module of the OPTRX ™ b pager or an appropriate equivalent source. A strobe input 14 of signal combiner 10 is also coupled to the OPTX ™ pager circuitry at the data sample strobe port PB2 of the microcomputer module or an appropriate substitute. A data output 16 is provided which is coupled to an electrical connector forming a portion of the pager suitable for contact with a mating connector in a peripheral such as a printer.

When the pager is appropriately mated with its peripheral, data output 16 is coupled to a data input terminal 18 which forms an input to an interface circuit 20. Interface circuit 20 is in turn coupled to a printer processor 22 which appropriately processes information from the interface circuit and drives printer 24.

In the preferred embodiment data input 12 is coupled through a resistor 26 to the base of a PNP transistor 28. The emitter of transistor 28 is coupled to a 3.3 volt DC source available within the pager. The collector of transistor 28 is coupled to a resistor 30 to the base of an NPN transistor 32. Also coupled to the base of transistor 32 is a resistor 34 to ground. The emitter of transistor 32 is coupled to a 1.5 volt DC source available within the pager. The collector of transistor 32 is connected to the data output 16.

Strobe input 14 of signal combiner 10 is coupled through a resistor 36 to the base of an NPN transistor 38. The emitter of transistor 38 is coupled to ground and the collector of transistor 38 is coupled to data output 16. In most instances, general purpose small signal transistors are appropriate for transistors 28, 32, and 38.

Data input 18 of interface circuit 20 is coupled to the non-inverting input of a comparator 40 and the non-inverting input of a comparator 42. Comparators 40 and 42 are powered from a 5.0 volt DC supply available within the printer. Commonly available comparators such as the MC3302 may be suitable for use as comparators 40 and 42. A pull-up resistor 44 is coupled from data input 18 to the 5 volt source.

Resistors 46, 48, and 50 are connected in series between the 5 volt supply and ground to set up a voltage divider to serve as references for comparators 40 and 42. The inverting input of comparator 40 is coupled to the junction of resistors 46 and 48 at a node designated 52. The inverting input of comparator 42 is coupled to the junction of resistors 48 and 50 at a node designated 54. In the preferred embodiment the DC voltage at node 52 is approximately 2.2 volts and the DC voltage at node 54 is approximately 0.7 volts.

The output of comparator 40 is preferrably an open collector output thereby necessitating a pull-up resistor 56 coupled to the 5 volt source. The output of comparator 40 forms a data output line 58.

Similarly the output of comparator 42 is preferably an open collector output, thereby necessitating a pull-up resistor 60. The output of comparator 42 provides a read output line 62.

In the preferred embodiment, printer processor 22 may include a microcomputer such as the Motorola MC146805 microcomputer and read output line 62 may be coupled to the interrupt request input of the microcomputer. The output line 58 may be coupled to a data input line of the microcomputer. One skilled in the art will readily recognize various techniques to interface printer processor 22 to printer 24 depending on the particular needs at hand.

Figure 2:
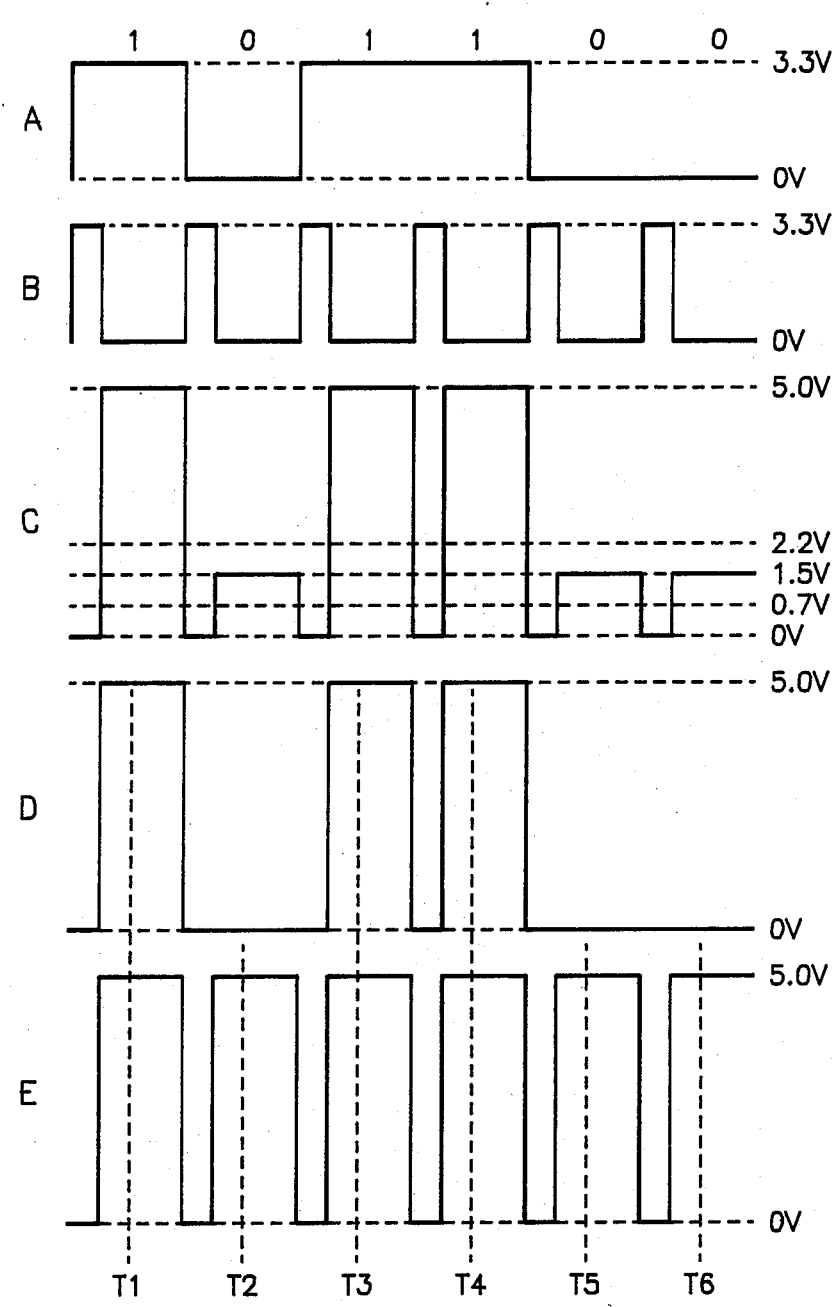
FIG. 2 shows a timing diagram illustrating the operation of the present invention.

In the preferred embodiment, the resistor values tabulated in table 1 have been found to work well. These values, however, are offered only by way of example and the present invention is not limited to these values. Turning now to FIG. 2 a timing diagram illustrating the operation of the circuit of FIG. 1 is shown. FIG. 2A shows an example 6 bit binary signal such as might be present at data input 12.

TABLE 1

| Resistor Number | value |
| --- | --- |
| 26 | 270K |
| 30 | 18K |
| 34,36 | 51K |
| 44,56,60 | 10K |
| 46 | 27K |
| 48 | 15K |
| 50 | 6.8K |

While a binary digital signal is shown in the preferred embodiment, one skilled in the art will recognize that the present method and apparatus may be usefull for any multi-level logic signal. The example data shown in FIG. 2A is equivalent to a binary data pattern of "101100". FIG. 2B shows a sample signal pattern which is ideally present at the strobe input when the present invention is utilized in conjunction with the OPTRX TM pager as previously described. However, one skilled in the art will readily recognize that the signal pattern of FIG. 2B may be readily generated by producing a pulse having a leading edge coinciding with the beginning of each data bit. It is also clear that the pulse may occur anywhere inside the data bit and still provide the necessary "read" signal (as is the actual case with the OPTRX TM pager) as long a valid data follows each read signal.

Referring back now to FIG. 1 it will be clear to those skilled in the art that transistor 38 will be turned on whenever the signal a strobe input 14 is in its logical high state (1). Similarly, transistor 28 will be turned on whenever the signal at data input 12 is in its logic low state (0). Transistor 32 will be turned on whenever transistor 28 is turned on and transistor 38 is turned off. As a result, whenever the signal at strobe input 14 assumes a logical high state, data output 16 will assume a logical low state.

FIG. 2C shows the resultant combined signal resulting from the signals of FIG. 2A and 2B being combined by signal combiner 10. Each high-going pulse at strobe input 14 results in a low-going signal at the data output 16. In between each of these low going pulses, the signal assumes a high level if the original data at data input 12 is at a logic "1" and an intermediate level if the signal at data input level is at a logic "0". In this manner the low-going pulses which coincide with the strobe input signal at strobe input 14 creates a read signal which may be used to determine that one bit of valid data follows and may be read immediately following the read signal.

Interface circuit 20 operates on the signal of FIG. 2C by utilizing comparators 40 and 42 to determine whether or not the :;ncomming signal lies above the voltage at node 52, below the voltage at node 54, or between the voltage at node 52 and the voltage at node 54. Comparator 40 examines the data at data input 18 and produces a high approximating the 5 volt supply whenever the signal at data input 18 is greater than the voltage at node 52 and produces a low output approximating ground whenever the voltage at data input 18 is less than the voltage at node 52. This resultant signal is shown in FIG. 2D. Comparator 42 examines the data present at data input 18 and produces a low output approximating ground whenever the data at data input 18 is less than the voltage node 54. When the signal at data input 18 is greater than the voltage at node 54, comparator 42 produces a high output approximating 5 volts. This signal is shown in FIG. 2E.

It will be clear to those skilled in the art that at times T1, T2, T3, T4, T5, and T6 the data at data output line 58 has logic values equivalent to "101100" which is equivalent to the original input data at data input 12. Therefore, the signal present at read output lines 62 may be utilized to instruct the printer processor to expect a single valid bit of data immediately following the high-going transition of the signal of FIG. 2E. By utilizing the MC146805 microcomputer in printer processor 22, read output line 62 may simply address the interrupt request line of the microcomputer and thereby instruct the microcomputer to fetch data from a designated data input line of the microcomputer at a time shortly after the upward transition of the read output line 62. One skilled in the art will also recognize that hardware equivalants of the preferred microcomputer based printer processor may be readily implemented.

In certain applications it may be desirable to convert the signal of FIG. 2D back into the original inal data signal shown in the signal of FIG. 2A. One skilled in the art will readily recognize that this may be accomplished by simple combinational logic utilizing data output line 58 and read output lines 62 as inputs.

While in the particular embodiment shown, a periodic signal at data output 16 makes it possible for data to be transmitted at any number of baud rates and in fact may continuously vary in baud rate up to the theoretical maximum operating frequencies of the hardware involved without serious deterioration of the integrity of the data. It is also clear that the microcomputer of the pager could readily be utilized in a time sharing mode while transmitting data to the printer, so that data could be fed piece meal to the printer without synchronization problems or degradation in signal integrity. By providing a read signal prior to every bit of valid data, the hardware involved is totally unencumbered by the clocking limitations imposed by the prior art.

Thus it is apparent that in accordance with the present invention, an apparatus that fully satisfies the objectives, aims and advantages as set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications, and variations as fall within the spirit and broad scope of the appended claims.

What is claimed is:

1. In a radiopager code responsive system for interfacing with a peripheral device, a method of encoding a digital signal and decoding the encoded digital signal comprising the steps of:
   supplying a two level binary digital signal comprised of a series of data bits,
   supplying a pulse signal with single pulses corresponding to each of said data bits,
   combining the binary digital signal and the pulse signal to produce an encoded signal having a first level corresponding to one level of said two level binary signal, a second level corresponding to the other level of said two level binary signal and a third level immediately preceding each of said first and second level, for each of said data bite;
   detecting when the encoded signal is at the third level and providing a decoded data output signal at one level at that time;
   detecting when the encoded signal is at one of said first and second levels and providing the decoded data output signal at said one level at that time, and
   detecting when the encoded data level signal is at the other of said first and second levels and providing the decoded data output signal at another level at that time, and
   providing a pulse output signal with a single pulse occuring during each data bit of the decoded data output signal.

* * * * *